(12) United States Patent
Bratten

(10) Patent No.: US 6,495,031 B1
(45) Date of Patent: Dec. 17, 2002

(54) ENCLOSED BELT FILTER APPARATUS

(76) Inventor: Jack R. Bratten, 4657 Twin Fawn La., Orchard Lake, MI (US) 48324

( * ) Notice: Subject to any disclaimer, the term of this patent is extended or adjusted under 35 U.S.C. 154(b) by 7 days.

(21) Appl. No.: 09/906,565

(22) Filed: Jul. 16, 2001

(51) Int. Cl.[7] .......................... B01D 33/04; B01D 35/01; B01D 35/30

(52) U.S. Cl. ......................... 210/97; 210/104; 210/105; 210/387; 210/391; 210/392; 210/398; 210/400; 210/406; 210/416.5; 210/472; 210/120

(58) Field of Search .......................... 210/97, 103, 104, 210/105, 120, 188, 387, 391, 392, 393, 398, 400, 401, 406, 407, 409, 411, 412, 416.1, 416.5, 472

(56) References Cited

U.S. PATENT DOCUMENTS 4,664,813 A * 5/1987 Schneider .................... 210/400

* cited by examiner

Primary Examiner—Robert J. Popovics
(74) Attorney, Agent, or Firm—John R. Benefiel

(57) ABSTRACT

A liquid filter apparatus includes a filter media belt enclosed by sealably mated cover pan and floor pan defining a vacuum chamber connected to a sealed clean liquid tank, with clean liquid pumped out continuously to draw liquid to be filtered into an upper region of the filter chamber via on inlet hose connected to a source of liquid to be filtered. The cover pan is lifted after the vacuum is relieved to allow indexing of the filter media belt. A main control valve to the clean liquid tank is closed and pumping liquid continues during indexing. A vacuum control device limits the maximum vacuum developed in the clean liquid tank and a vacuum pump removes air from the tank for priming and to eliminate excess accumulated air.

10 Claims, 3 Drawing Sheets

ENCLOSED BELT FILTER APPARATUS

BACKGROUND OF THE INVENTION

This invention concerns filtration apparatus of a type used in industrial operations to remove contaminants from a liquid used during manufacturing. After machining such parts as engine blocks, manifolds, it is usual to wash the parts to remove chips, grinding swarf, cutting fluid residue, etc. The parts are conveyed through an enclosed washer chamber where spray jets wash off these contaminants, with the spray liquid and washed off material collected in a tank beneath the washer chamber.

It is necessary to remove the chips and other debris from the liquid to allow continued reuse of the liquid in the washing sprays, and in the past, an inclined filter media belt filter was mounted within the tank, periodically indexed to remove accumulated filtrate, the liquid drawn through the filter media belt to be filtered. A drag conveyor is also periodically indexed to convey accumulated solids out of the tank for disposal. See U.S. Pat. No. 6,042,726 for an example of such a filter.

In this arrangement, the filter apparatus is difficult to service, as the belts and conveyor are enclosed within the washer collector tank.

In some versions, the feeding of disposable media over the belt to remove fine particles would require access to the rear of the tank, which is often difficult in many installations.

To pump the contaminated liquid to an external filter would require a separate tank to receive the liquid in order to allow belt indexing, increasing the floor space and cost of the equipment required.

This situation is also presented with other stand alone equipment such as individual grinders and other machine tools having a dedicated chip cutting fluid collection tanks below the machining zone.

It is the object of the present invention to provide a filter apparatus for removing contaminants received in a tank such as a washer collection tank or other equipment, which apparatus is not necessary to be disposed within the tank and does not itself require a separate collection tank and which can quickly carry out the periodic indexing of a filter media belt to clean solids therefrom.

SUMMARY OF THE INVENTION

The above recited object, and others which will be understood upon a reading of the following specification and claims are achieved by a filter apparatus mounted above a clean tank. A downwardly facing upper pan is movable relative a floor pan to bring a perimeter flange into engagement with a hose seal disposed on the lower pan to create a sealed filter chamber. A vacuum box is mounted below the lower floor pan and connected to the clean tank by a piping connection to transfer fluid to a clean tank, the piping extending out from one side of the vacuum box, down to the level of the clean tank and back into one side of the clean tank. The piping connection has a main control valve located along the length of the fluid connection.

A pump is connected to the clean tank for pumping filtered liquid back to the utilizing equipment, which pumping generates a negative pressure in the clean tank (and also the vacuum box).

A filter belt loop has an upper segment extending into the filter chamber over one segment of the hose seal which extends entirely around the filter chamber and onto a perforated plate supported on a set of elongated bars fixed on the lower pan, and out of the filter chamber over another segment of the hose seal.

A vacuum pump is provided to evacuate air from the tank to prime liquid flow drawn into an inlet pipe connected to the upper pan and extending into the collecting tank containing the liquid to be filtered. Upon opening of the control valve, liquid is drawn into the vacuum chamber, passing through the filter belt and into the vacuum box and thence into the clean tank.

To index the belt to clean accumulated solids, a vacuum breaker valve is opened to allow air into the filter chamber to relieve the vacuum, and drain the dirty liquid from the filter chamber. The main control valve is thereafter closed. A power cylinder lifts the upper pan from the hose seal to allow the filter media belt to be advanced to carry the belt segment on which the solids have accumulated out of the chamber to be discharged.

The recirculation pump continues to be operated during indexing to insure an uninterrupted supply of clean liquid and to maintain a vacuum in the clean tank. The vacuum level increases during pumping to a predetermined maximum level, with an air bleed vacuum control device introducing air into the clean tank when the maximum vacuum is reached to prevent an excessive vacuum level from developing which could interfere with the pumping of clean liquid out of the tank.

Upon reopening the main control valve, liquid to be filtered is again quickly drawn into the vacuum chamber, through the filter belt and into the clean tank via the vacuum box.

The vacuum pump is operated as necessary to eliminate excess air until a predetermined liquid level is restored in the tank sensed by a liquid level switch.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
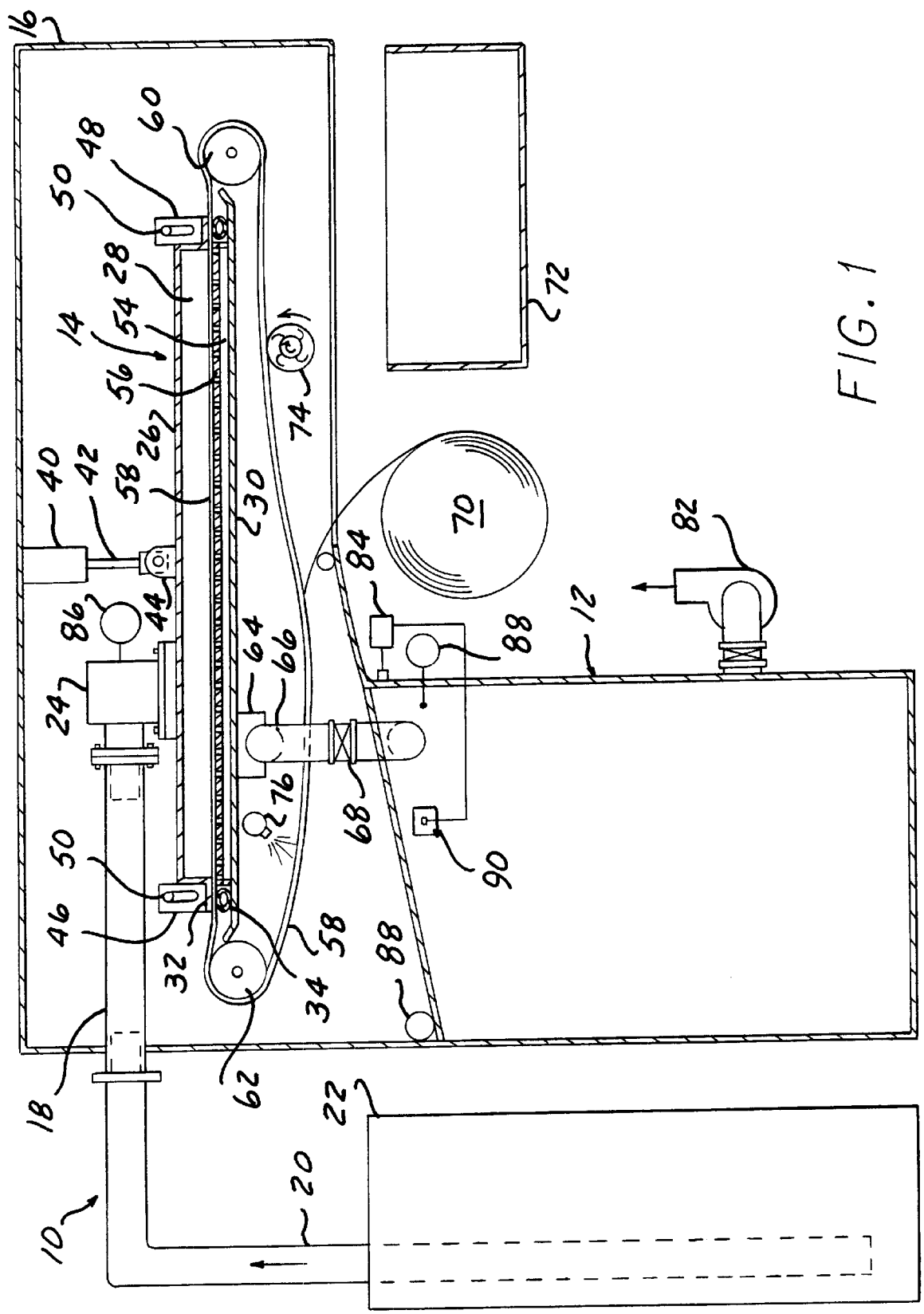
FIG. 1 is a diagrammatic representation of the filter apparatus according to the present invention.

Referring to the drawings, FIG. 1 shows the filter apparatus according to the present invention, which includes a clean liquid tank 12, and a recirculating filter media belt 14 disposed within an enclosure 16 affixed atop the clean tank liquid tank 12.

An inlet hose 18 is connected to an inlet pipe 20 extending down into a collection tank 22 for receiving liquid to be filtered, as from a parts washer.

The clean tank 12 could itself also be received inside the collection tank 22 which would typically be of much larger volume.

The inlet hose 18 is connected to a rotatable inlet fitting 24 affixed to the top of a cover pan 26 so as to be in communication with a vacuum filter chamber 28 defined between the inside the cover pan 26 and a floor pan 30.

The rectangular cover pan 26 has an outwardly projecting perimeter flange 32 which overlies a hose seal 34 resting on the upper surface of the floor pan 30 and coextensive with the flange 30.

Figure 2:
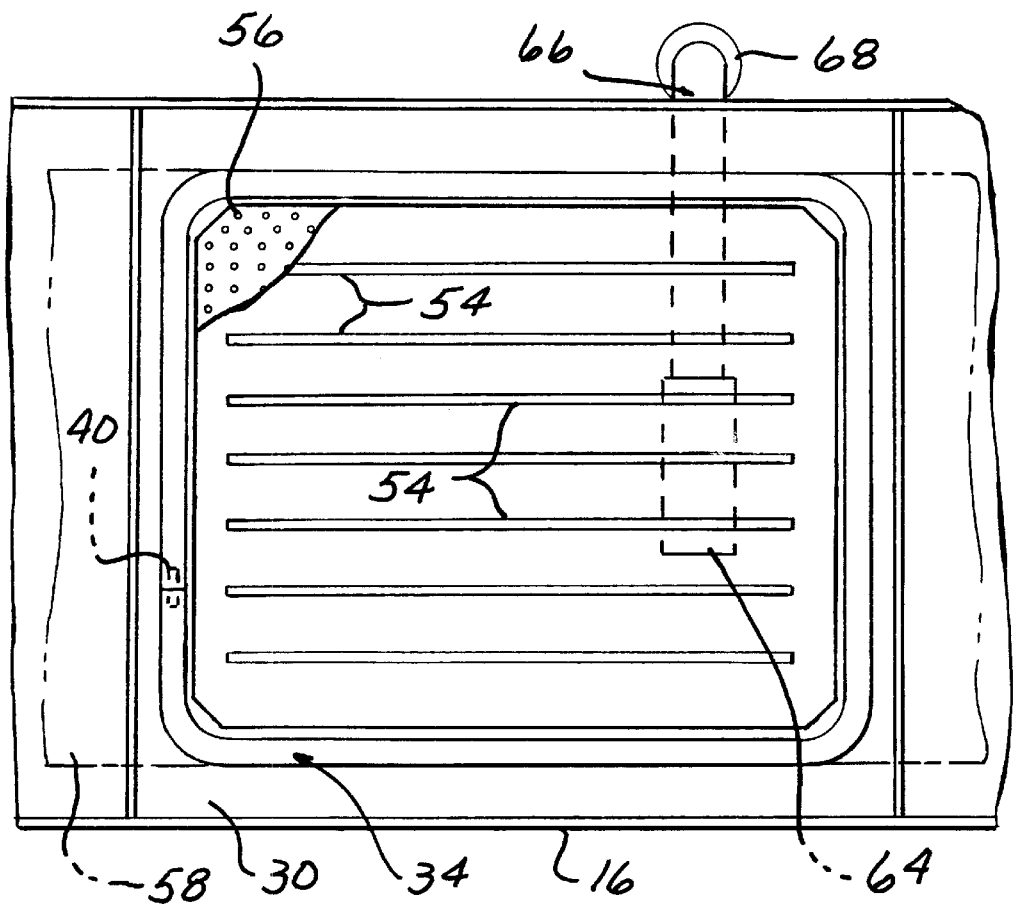
FIG. 2 is a plan view of the lower pan and related components.
Figure 2B:
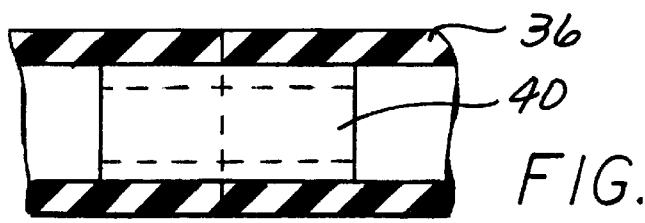
FIG. 2B is a fragmentary enlarged view of a portion of the hose seal showing the end connection.
Figure 2A:
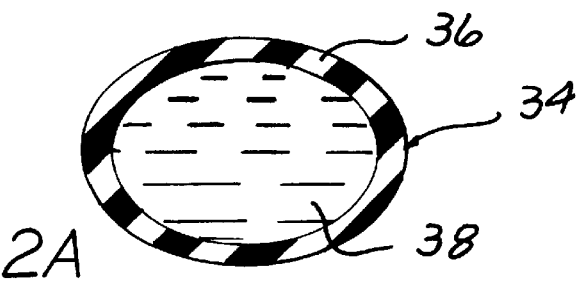
FIG. 2A is an enlarged sectional view of the hose seal.

The hose seal 34 comprises a length of distensible elastomeric sealed tube 36 filled with a liquid 38 (FIG. 2B) and having its ends connected with a coupling 40 (FIG. 2B) so as to define a sealed closed vessel. The hose seal 34 can accommodate misalignments of the flange 32 such as caused by tilting of the cover pan 26 since pressure on one portion will force liquid to another portion to expand the tube 36 to fill any gaps.

The cover pan 26 is mounted for guided up and down movement by actuation of a power cylinder 40 having a rod 42 pinned to a clevis 44 affixed to the top of the cover pan 26. Two slotted front tabs 46 and rear tabs 48 having shorter slots are welded to the front and rear corners respectively of the cover pan 26.

Figure 1A:
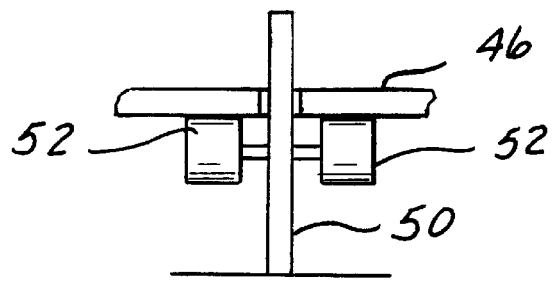
FIG. 1A is an enlarged view of a portion of the filter apparatus shown in FIG. 1 taken in the direction of the arrows A—A in FIG. 1.
Figure 3:
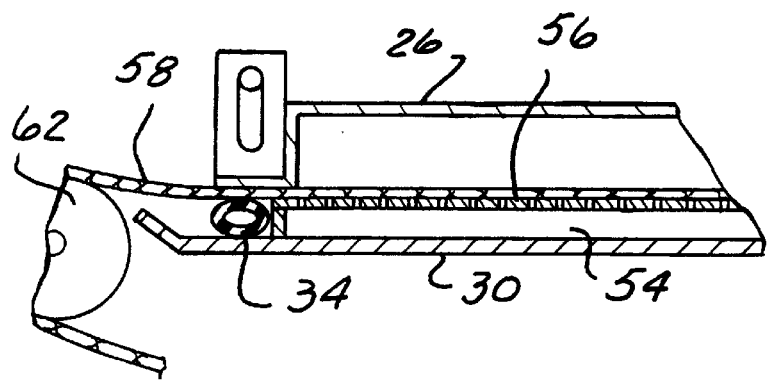
FIG. 3 is a fragmentary enlarged longitudinal sectional view of portions of the filter apparatus shown in FIG. 1.
Figure 4:
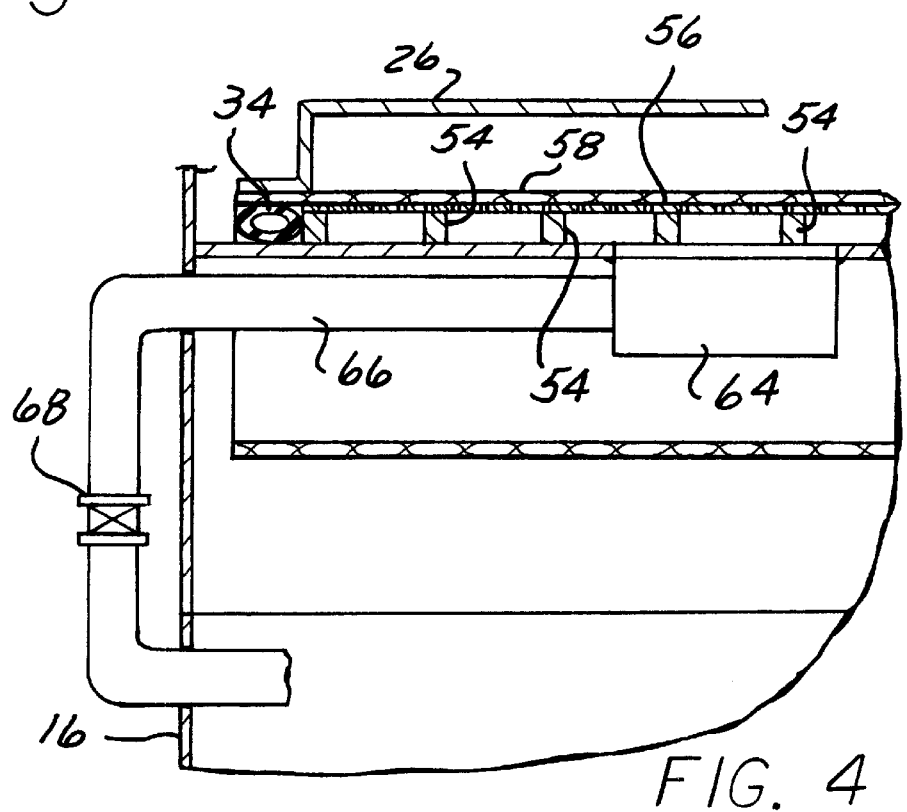
FIG. 4 is an enlarged fragmentary view of a transverse section taken across the cover pan and lower pan components shown in FIG. 1.

Guide pins 50 are fixed to extend into the slotted tabs 46, 48 to limit upward travel and to guide movement of the cover pan 26, with side rollers 52. Rollers 52 on the tab sides locate the cover pan 26 side to side (FIG. 1A).

The cover pan 26 is tilted by the affect of the unequal slots when the cover pan 26 is raised, causing it to be higher at the discharge end to allow the filter cake to pass out when the filter media belt 58 is indexed.

The floor pan 30 has a series of spaced apart parallel bars 54 overlain with a perforated plate 56 to define a support for a permanent media belt 58 extending through the vacuum chamber 28 atop the perforated plate 56. The bars 54 and the perforations in the plates provide openings allowing flow through the filter belt 58 and through the perforated plate 56. The permanent media belt 58 has ends connected to form a loop driven by a shaft mounted reducer 60 around an idler roller 62 when an index cycle is initiated, the return segment thereof passing beneath the floor pan 30.

A vacuum box 64 is mounted below an opening in the floor pan 30, connected to a pipe connection 66 extending to one side of the enclosure 16 and into the upper end of the clean tank 12, a main control valve 68 installed therein to open or close fluid communication between the vacuum box 64 and the clean tank 12.

A disposable media roll 70 may be mounted below the enclosure 16 and fed onto the permanent media belt 58 (started by use of pull bars in the well known manner). Such disposable media can be used depending on the nature of the solids to be filtered out to prevent rapid clogging of the permanent media belt 58 by very fine particles.

When indexed, the permanent media belt 58 is advanced to dump accumulated filter cake out to a receptacle 72.

A rotary beater brush 74 may also be provided to aid in dislodging the solids, and an array of spray nozzles 76 receiving clean liquid under pressure forms jets directed at the inside of the belt 58 at the other end cleans the entrapped particles. A sloping floor 78 of the enclosure 16 collects the spray liquid and dislodged solids directs the same to a drain 80.

A main pump 82 is connected to the lower level of the clean tank 12 to return clean liquid to the washer or other utilizing equipment (not shown).

A vacuum is developed in the clean tank 12 as the liquid is pumped out to cause liquid to be filtered to be drawn up the draw pipe 20 into chamber 28, through the belt 58 (and disposable media if used), into the vacuum box 64 and connection 66, and into the clean liquid tank 12. The pump 82 is continuously operated to supply clean liquid to the utilizing equipment.

Due to the vacuum condition in the chamber 28, a large downward pressure force is exerted on the cover pan 26, compressing the hose seal 34 beneath the flange 32 to insure a complete seal.

A vacuum pump 84 is also connected to the upper region of the clean tank 12 to be able to evacuate air until a predetermined liquid level is reached sensed by a liquid level switch 90. This is done to prime the system at start up to speed filling of the tank 12 with liquid at that time.

The vacuum pump 84 also can eliminate entrained air in the liquid accumulating in the upper region of the tank 12.

In order to carry out an indexing of the media belt 58, a vacuum breaker valve 86 is connected to the fitting 24 to allow air to enter the system and eliminate the vacuum condition.

The liquid in the inlet hose 18 will then flow back down into the tank 22.

When the vacuum is relieved as sensed by a vacuum switch 88, the control valve 68 is immediately operated by the apparatus controls (not shown) to be closed.

The cover pan 26 can then be raised and the belt 58 advanced to carry the segment thereof which was in the chamber 28 out of the chamber to position a fresh segment atop the perforated plate 56.

In the meantime, the pump 82 has continued to draw clean liquid from the tank 12, increasing the vacuum level therein.

A vacuum control device 88 limits the vacuum level to a predetermined maximum (12" hg) which allows the pump 82 to continue pumping smoothly.

The indexing cycle can be completed in a short time, i.e., 30 seconds at a belt speed of 40 ft/minute, and the tank 12 should be sized to allow clean liquid to be continuously pumped during that interval.

After the cover pan 26 is again lowered, vacuum breaker valve 86 closed and control valve 68 reopened, liquid is again drawn into inlet hose 18 and is collected in the clean tank 12 after passing through the filter chamber 28.

The vacuum pump 84 is operated to eliminate excess air until liquid rises to a maximum level, sensed by a liquid level switch 90.

Thus, a filter apparatus has been provided which is located above the tanks and is thus readily accessible for service.

A rapid priming and indexing is enabled to minimize the filter downtime to reduce the capacity required for a given installation.

What is claimed is:

1. A filter apparatus for filtering contaminated liquid collected in a tank comprising:
   a sealed clean liquid tank;
   a pump connected to said tank for pumping out clean liquid from said tank;
   a vacuum box with a fluid connection to said clean liquid tank;
   a floor pan extending above said vacuum box, and having a fluid connection thereto;

a filter media belt extending over said floor pan, with an interposed support providing openings to allow flow through said filter media belt and into said vacuum box;

a cover pan positionable over said floor pan with a sealed relationship to define a filter chamber therebetween;

an actuator connected to allow separation of said cover pan and floor pan;

a fluid connection between said filter chamber and said tank of liquid to be cleaned;

a selectively operable control valve interposed in said fluid connection between said vacuum and said clean liquid tank to close or open communication therebetween;

a vacuum breaker valve selectively operable to allow venting of said filter chamber and separation of said cover pan and floor pan; and, an indexing drive for said advancing said filter media belt when said cover pan and floor pan are separated.

2. The filter apparatus according to claim 1 wherein said cover pan has an outwardly projecting perimeter flange, and further including a hose seal disposed on said floor pan and comprising a sealed distensible tube filled with liquid engaged with said flange when said cover pan and floor pan are brought together.

3. The filter apparatus according to claim 1 wherein said clean liquid tank is disposed beneath said vacuum box, floor pan and cover pan.

4. The filter apparatus according to claim 3 wherein said vacuum box, floor pan, and cover pan are enclosed in a containment enclosure affixed atop said clean liquid tank.

5. The filter apparatus according to claim 4 wherein said filter media belt forms a closed loop which is circulated during indexing of said filter media belt, said enclosure having a bottom opening allowing discharge of solids from said filter media belt.

6. The filter apparatus according to claim 5 wherein said containment enclosure has a sloping bottom on an end thereof opposite said discharge opening, and further including a cleaning liquid spray nozzle directed at a segment of said filter media belt over said sloping bottom so that liquid is collected thereon, and a drain opening for allowing drainage of said collected liquid.

7. The filter apparatus according to claim 5 further including a disposable media roll beneath said containment enclosure and fed onto said filter media belt segment extending below said floor pan to be carried over said floor pan support with said filter media belt.

8. The filter apparatus according to claim 1 further including a vacuum control device connected to said clean liquid tank controllably introducing air into said clean liquid tank whenever a predetermined maximum vacuum level is reached with said control valve closed and said pump continues to pump liquid from said clean liquid tank.

9. The filter apparatus according to claim 8 further including a vacuum pump connected to said clean liquid tank operated to pump excess air out of said clean liquid tank until a predetermined liquid level therein is reached.

10. The filter apparatus according to claim 1 wherein said cover pan is mounted to be raised so as to be tilted up at the discharge end by said actuator.

* * * * *